G. H. McCLAREN.
AUTOMOBILE POWER TRANSMITTING APPARATUS.
APPLICATION FILED MAR. 14, 1917.
1,282,894.
Patented Oct. 29, 1918.
2 SHEETS—SHEET 1.
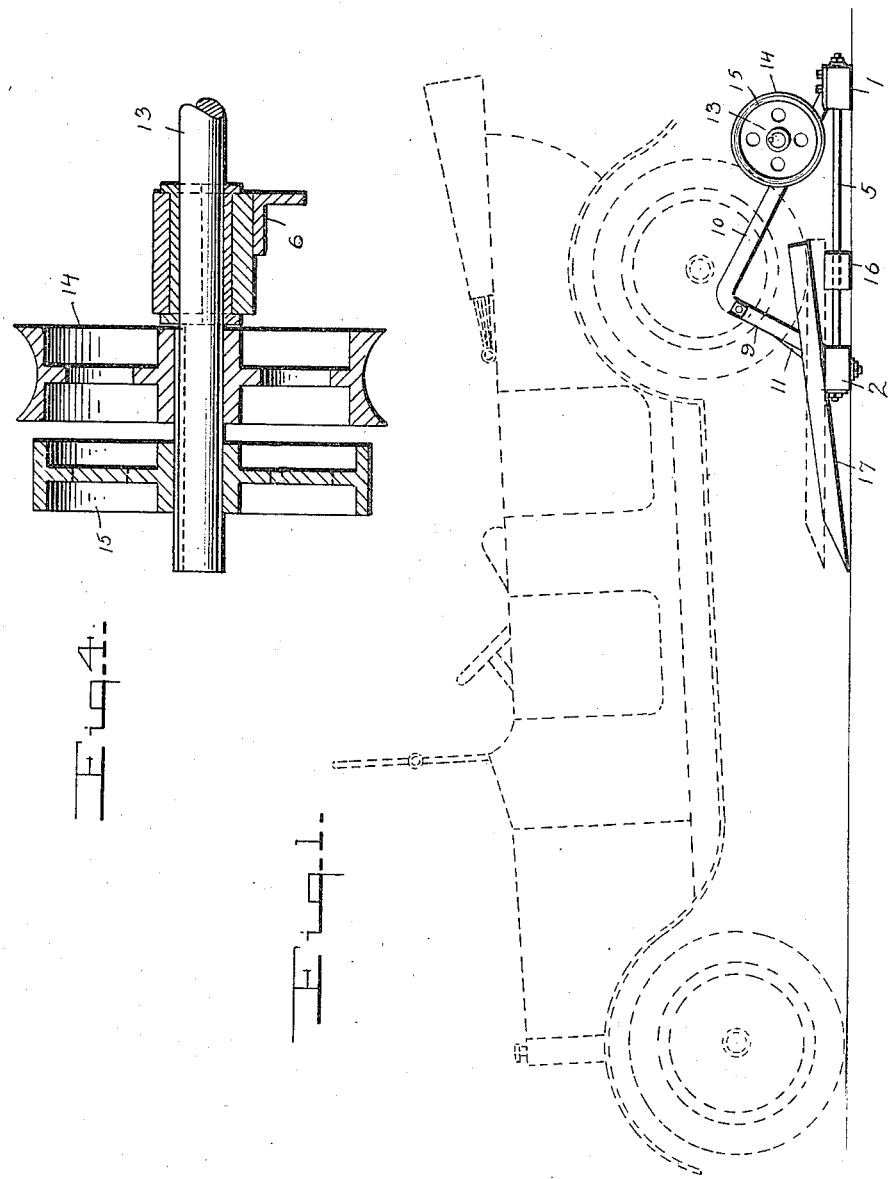
WITNESSES
RM Jones
S M McColl
INVENTOR
George H. McClaren
BY Richard Olwen
ATTORNEY G. H. McCLAREN.
AUTOMOBILE POWER TRANSMITTING APPARATUS.
APPLICATION FILED MAR. 14, 1917.
1,282,894.
Patented Oct. 29, 1918.
2 SHEETS—SHEET 2.
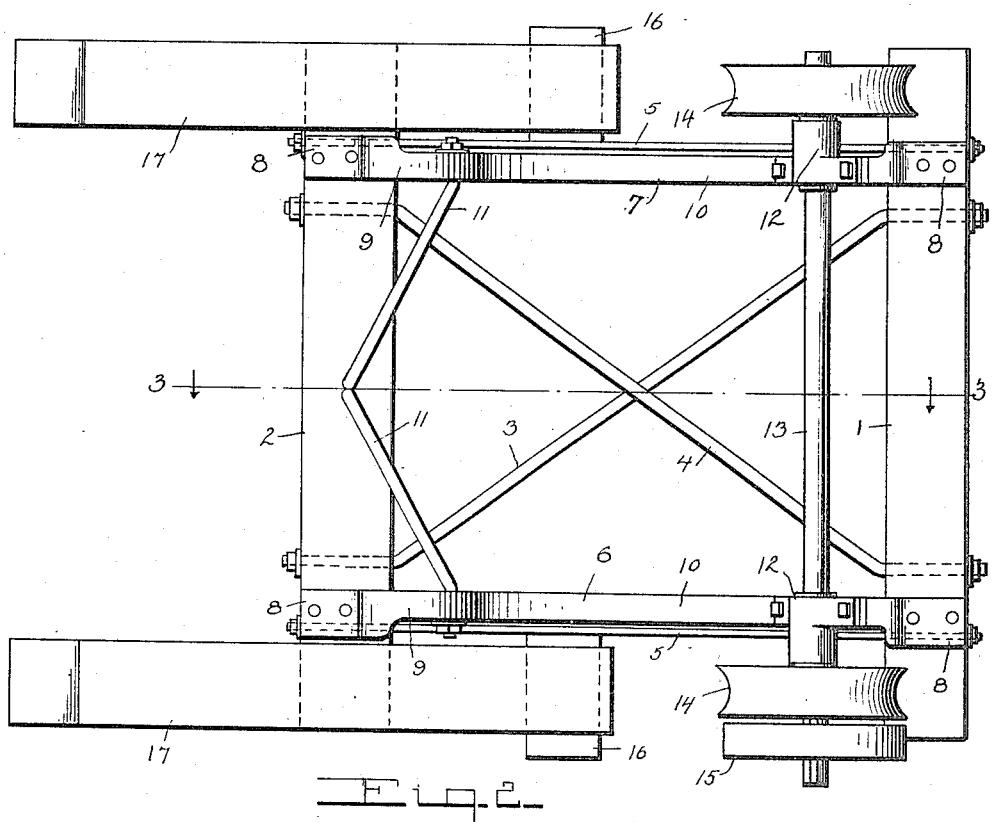
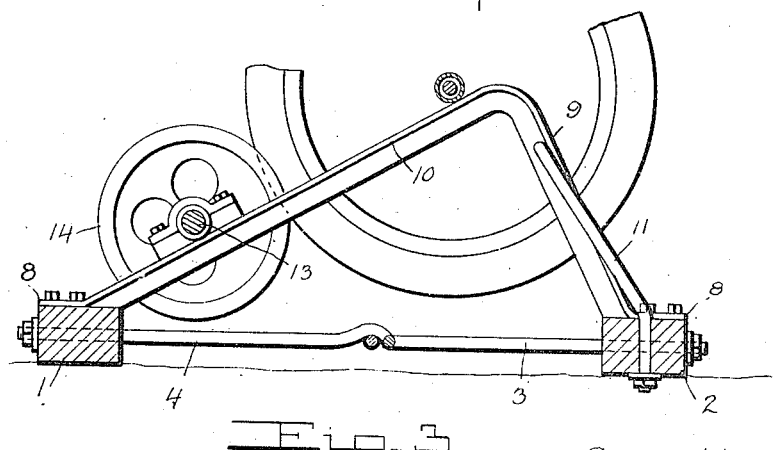
WITNESSES
INVENTOR
George H. McClaren
BY
ATTORNEY

UNITED STATES PATENT OFFICE.

GEORGE H. McCLAREN, OF MULLINVILLE, KANSAS.

AUTOMOBILE POWER-TRANSMITTING APPARATUS.

1,282,894.
Specification of Letters Patent.
Patented Oct. 29, 1918.

Application filed March 14, 1917. Serial No. 154,823.

*To all whom it may concern:*

Be it known that I, GEORGE H. McCLAREN, a citizen of the United States, residing at Mullinville, in the county of Kiowa and State of Kansas, have invented certain new and useful Improvements in Automobile Power-Transmitting Apparatus, of which the following is a specification.

This invention relates to improvements in automobile power transmitting apparatus, and more particularly to apparatus including a jack designed for supporting motor vehicles to permit them to be operated as a source of power.

The main object of the invention is to provide a simply constructed apparatus of this character which may be quickly applied and which is equipped with means for transmitting the power from the driving wheels of the vehicle to the object to be driven.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a side elevation of an apparatus constructed in accordance with this invention showing a car in position thereon in dotted lines, Fig. 2 is a plan view thereof with the car removed, and Fig. 3 is a longitudinal section taken on the line 3—3 of Fig. 2.

Fig. 4 is a detail horizontal section.

In the embodiment illustrated, the apparatus constituting this invention comprises a supporting frame composed of longitudinally spaced transversely extending beams 1 and 2 composed of any suitable material, preferably wood, and which are connected and braced by diagonally disposed rods 3 and 4 and by longitudinally disposed rods 5.

Mounted on this frame are two vehicle supporting members 6 and 7 which are substantially inverted V-shape in form having laterally extending apertured attaching feet 8 to provide for the connection of these members to the beams 1 and 2 at points spaced substantially a distance corresponding to the distance between the driving wheels of the car to be supported thereon. The front portions or arms 9 of these members 6 and 7 are inclined abruptly from beam 2 upwardly which is the front part of the jack and the rear arms 10 inclined gradually from the apices of the members toward their rear ends so that when the axle of the car has been positioned above the members it will slide gradually down the incline of the arms 10 to position the wheels of the car in operative engagement with wheels carried by the jack as will be presently described. The front arms 9 of the members 6 and 7 are preferably braced by rods 11 which extend from the beam 2 to points near the apices of the members and are connected therewith by any suitable means, said rods being here shown passed through said beam and members and provided with attaching nuts.

The long arms 10 of the supporting members 6 and 7 are provided near their lower ends with bearings 12 in which is rotatably mounted a shaft 13 which projects at its opposite ends beyond the outer faces of said members and has fixed to said projecting ends wheels 14, said wheels being keyed or secured to the shaft in any suitable manner. These wheels 14 are so positioned on the shaft that they will be disposed exactly opposite the driving wheels of the car which is to be utilized as a source of power for imparting motion to the shaft 13.

A pulley 15 is shown mounted on one end of shaft 13 beyond the wheel on said end and which is designed to have a belt passed thereover for transmitting motion from the shaft 13 to any object to be driven. While this pulley is shown mounted on the end of the shaft, it is obvious that it need not necessarily be so mounted but may be fixed to the shaft at any point thereon, either between the members 6 and 7 or outside the wheels on the shaft 13.

It is to be understood that while the wheels 14 are shown with concave peripheral faces, they may be made flat or in any other desired form so that if desired the tires of the driving wheels of the car to be used may be removed and the rims placed in contact with these wheels for imparting motion to the shaft 13 and thereby avoiding wear on the vehicle tires.

It is also to be understood that the members 6 and 7 may be formed of any suitable material, preferably of cast iron.

For use in connection with the supporting members 6 and 7, and to provide means for positioning the car on said members, plates or bars 17 are provided which are designed to operate as levers for positioning a car on the members 6 and 7. These plates 17 are designed to rest on the projecting ends of beam 2 outside the members 6 and 7, being engaged therewith at points to the rear of the center thereof so that their front ends will be inclined downwardly and forwardly and rest on the supporting surface which may be either the ground or the floor of a building, so that the car to be utilized may be readily rolled up these inclined plates to position it on the members 6 and 7. In so positioning the car it is backed or driven backward up the inclined plates 17 until the rear or driving wheels thereof come in contact with the peripheries of wheels 14 of the jack.

Before the car is driven up these plates 17, blocks as 16 are positioned under the rear end of said plates to prevent tilting thereof when the weight of the car reaches this point. After the car has been positioned on the members 6 and 7 with the driving wheels thereof in engagement with the wheels 14, these blocks 16 are removed from under the rear ends of plates 17 and the rear axle of the car will then rest on the inclined arms 10 of the supporting members 6 and 7 with the driving wheels in close engagement with the wheels 14. The plates 17 will then be removed and the car is ready for use.

It is to be understood that the blocks 16 are of the same height as the height of the beam 2 so that when a car rides up on plates 17, they will be tilted to cause the front ends of said plates to rise and their rear ends to rest on said blocks, and when the car reaches this point, the rear ends of the plates 17 are elevated by depressing their front ends sufficiently to permit the removal of the blocks 16, and when the rear axle of the car is engaged with the arms 10 of members 6 and 7, the weight of the car will be removed from plates 17 and said plates may then be readily removed and conveniently placed for future use.

From the above description it will be obvious that when a car has been positioned on the jack in the manner above described, and the engine started, the driving wheels thereof will operate to drive shaft 13 and through pulley 15 impart motion to any object to be driven.

When the car is to be used for other purposes, it may be readily removed from the jack by reversing the operation above described.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

1. An apparatus of the class described comprising a supporting base, vehicle supporting means rising therefrom and including inclined members, a shaft revolubly mounted on said means, wheels fixed to said shaft and intersecting the plane of the inclined members, and tilting means operable by the passage of a motor vehicle thereover for raising and positioning the driving wheels of said vehicle in peripheral engagement with the peripheries of said shaft carried wheels, and a portion of the vehicle carrying the wheels in contact with said inclined members.

2. An apparatus of the class described comprising a supporting base, vehicle supporting means rising therefrom and including inclined members, wheels revolubly mounted on said means in position for engagement by the wheels of the vehicle to be supported and intersecting the plane of the inclined members, a pulley connected to be driven by said wheels, and pivotally mounted bars carried by said base over which the vehicle is designed to pass and be elevated on the tilting thereof to position it in engagement with said supporting means.

3. An apparatus of the class described comprising a supporting base, vehicle supporting inclined members rising therefrom, means for positioning a car on said members comprising bars mounted for tilting movement on said base, being engaged therewith at points to the rear of the center of said bars so that their front ends will be normally inclined downwardly and forwardly and rest on the surface supporting said apparatus to provide for the ready rolling up thereon of the car to be utilized whereby said car is positioned on said supporting members, and wheels carried by said members and positioned to be engaged by the peripheries of the car wheels.

4. An apparatus of the class described comprising a supporting base, inclined vehicle supporting members rising therefrom, and wheels carried by said members and positioned to be engaged by the peripheries of the wheels of a car to be supported on said inclined members, means for positioning a car on said members comprising bars mounted for tilting movement on said base, being engaged therewith at points to the rear of the center of said bars so that their front ends will be normally inclined downwardly and forwardly and rest on the surface supporting said apparatus to provide for the ready rolling up thereon of the car to be utilized whereby said car is positioned on said supporting members, and means for limiting the rearward tilt of said bars.

5. An apparatus of the class described comprising a supporting base, inclined vehicle supporting members rising therefrom, wheels carried by said members and positioned to be engaged by the peripheries of the wheels of a car to be supported on said inclined members, means for positioning a car on said members comprising bars mounted for tilting movement on said base, being engaged therewith at points to the rear of the center of said bars so that their front ends will be normally inclined downwardly and forwardly and rest on the surface supporting said apparatus to provide for the ready rolling up thereon of the car to be utilized whereby said car is positioned on said supporting members, and means positioned under the rear ends of said bars for limiting the rearward tilting movement.

6. An apparatus of the class described comprising a supporting base, vehicle supporting means rising therefrom and comprising substantially inverted V-shaped members positioned on said base a distance apart less than the distance between the wheels of the vehicle to be supported thereby, said members being transversely alined and the front arms thereof abruptly inclined with their rear arms inclined gradually, a shaft rotatably mounted in said rear arms, wheels fixed to said shaft and positioned for engagement by the wheels of the supported vehicle, and motion transmitting means connected with said shaft.

In testimony whereof I affix my signature in presence of two witnesses.

GEORGE H. McCLAREN.

Witnesses:
J. A. SHERER,
A. COPSE.

Copies of this patent may be obtained for five cents each, by addressing the "Commissioner of Patents, Washington, D. C."